(12) United States Patent
Woods

(10) Patent No.: US 12,327,657 B1
(45) Date of Patent: Jun. 10, 2025

(54) APPARATUS FOR THE FABRICATION OF WIRE-EMBEDDED ADSORBENT STRUCTURES WITH BARE WIRE LEADS

(71) Applicant: Mainstream Engineering Corporation, Rockledge, FL (US)

(72) Inventor: Benjamin S. Woods, Melbourne, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 177 days.

(21) Appl. No.: 18/177,819

(22) Filed: Mar. 3, 2023

(51) Int. Cl.
| | |
|---|---|
| *H01B 13/004* | (2006.01) |
| *B05D 1/26* | (2006.01) |
| *B33Y 10/00* | (2015.01) |
| *B33Y 30/00* | (2015.01) |
| *B33Y 70/00* | (2020.01) |
| *H01B 13/14* | (2006.01) |

(52) U.S. Cl.
CPC ............ *H01B 13/004* (2013.01); *B05D 1/265* (2013.01); *B33Y 10/00* (2014.12); *B33Y 30/00* (2014.12); *B33Y 70/00* (2014.12); *H01B 13/14* (2013.01)

(58) Field of Classification Search
CPC .............................. H01B 13/004; B22F 12/57
See application file for complete search history.

(56) References Cited

U.S. PATENT DOCUMENTS

2020/0156318 A1* 5/2020 Stranberg ............... B33Y 50/02

* cited by examiner

*Primary Examiner* — Virak Nguon
(74) *Attorney, Agent, or Firm* — Michael W. O'Neill, Esq.

(57) ABSTRACT

An apparatus for the extrusion of a solid wire into a resin or paste is disclosed. The apparatus consists of two main parts including an adapter for constraining the wire until mixing with the resin or paste ('wire injector'), and a motor-driven gear system that feeds the wire into the injector ('wire extruder'). With this system, a bare wire can be extruded allowing for the creation of lead-in/lead-out sections, or for use with a resin or paste without an inherent curing, drying, or solidifying mechanism. Additionally, this apparatus allows for the extrusion of small (30-40 AWG) wires, enabling unique applications such as the injection of a resistive wire where smaller diameter wires are advantageous for minimized electrical or thermal overhead.

4 Claims, 9 Drawing Sheets

APPARATUS FOR THE FABRICATION OF WIRE-EMBEDDED ADSORBENT STRUCTURES WITH BARE WIRE LEADS

STATEMENT REGARDING FEDERALLY SPONSORED RESEARCH OR DEVELOPMENT

This invention was made with government support under 80NSSC22PB082 awarded by National Aeronautics and Space Administration. The government has certain rights in the invention.

CROSS-REFERENCE TO RELATED APPLICATIONS

This application is related to currently pending U.S. patent application Ser. No. 18/177,848, filed Month Day, Year Mar. 3, 2023, titled PROCESS FOR FABRICATING WIRE-EMBEDDED ZEOLITE STRUCTURES WITH BARE WIRE LEADS, and U.S. patent application Ser. No. 18/177,836, filed Mar. 3, 2023, titled WIRE-EMBEDDED ZEOLITE STRUCTURES WITH BARE WIRE LEADS, the disclosures of which are hereby incorporated by reference in this application.

BACKGROUND

The present disclosure is directed to enabling the unaided extruding of thin wires in Additive Manufacturing (3D printing) processes. Particularly, the present disclosure is concerned with using a two-part system of a wire extruder and a wire injector to grip, push, and extrude a wire into a 3D printing medium or structure.

In certain applications, it is advantageous to extrude thin (≥30 AWG) wires into a 3D printed structure with or without a printing medium simultaneously extruded. For example, wires for resistive heating elements require bare sections for connection to a power supply. Traditional wire or fiber feeding mechanisms solely or partially rely on the curing, drying, or solidifying of the printing medium in order for the wire to be extruded, making the extrusion of bare wire sections impossible.

Additionally, it may be advantageous in some applications for the wire to be extruded between layers of the printing medium rather than within the layer. Traditional mechanisms are only capable of extruding a wire/fiber with the printing medium, restricting the wire/fiber to being placed directly into that medium's layer.

For the foregoing reasons, there is a need for an apparatus that is capable of extruding thin (30+AWG) wires with or without the simultaneous extrusion of a printing medium with an inherent curing, drying, or solidifying mechanism.

SUMMARY

This invention consists of two main parts that together push and constrain a wire from a standard spool to the dispensing tip/nozzle. This system is installed on a paste/resin extruder, with the two parts mounted directly next to each other, or connected by a low-friction tube.

The first main part of this system is the wire extruder. The wire being extruded is first fed into a guide in the wire extruder. This guide centers the wire on a motor-driven wheel with chamfers that help center the wire, walls that help prevent the wire from moving off the wheel, and a center groove that grips the wire. A spring-loaded arm is then released, which provides tension against an attached free-spinning bearing that contacts the wire and holds it rigidly against the motor-driven wheel. With the wire constrained and gripped, the motor can be activated which pushes the wire into guide tube that fits closely against the idler bearing and drive wheel; this prevents the wire from getting caught around either the wheel or bearing. This guide tube then guides the wire into a low-friction tube to constrain the wire to the dispensing tip/nozzle.

At the end of tube, the second main part of this system, the wire injector, guides the wire from the tube into the dispensing tip/nozzle. The wire injector has a threaded port for mounting onto a standard paste/resin extruder, and an optionally threaded port for mounting a push-to-connect or other fitting to constrain the incoming wire's tube.

This system constrains the wire more effectively than existing systems, allowing it to not rely on any sort of curing, solidifying, or drying mechanisms of the printing medium to help pull the wire out of the system.

In a first implementation, an apparatus for the fabrication of an adsorbent bed formed from a wire embedded ceramic-based paste with bare wire leads extending beyond the adsorbent bed is described herein having a motor having a housing with a front cover and the motor having a shaft extending therefrom and the shaft having a motor-connected gear and a tensioner arm attached thereto, the tensioner arm containing an idler bearing, and a tensioner spring in compression between the housing and the tensioner arm; a wire extruder having a pre-extruder guide to center the wire as the wire enters the wire extruder, a drive gear, a drive wheel, and a guide tube, wherein the drive gear is geared to the motor-connected gear, the drive wheel is connected to the drive gear and, wherein after the wire pass through the pre-extruder guide, the drive wheel centers and grips the wire under tension provided by the idler bearing pressing against the wheel and wire, due to the tension spring pressing against the tensioner arm and idler bearing toward the drive wheel, is feed into the guide tube; and a wire injector having separate chambers for the wire and the ceramic-based paste and a nozzle for dispensing at least one of the wire alone, a combination of the wire and the ceramic-based paste, and the ceramic-based paste alone. A further implementation has the drive wheel including a groove, two chamfers, and two sidewalls, wherein the groove is between the two chamfers and the two chamfers are between the two sidewalls. Another implementation further has a tube to carry the wire from the wire extruder to the wire injector. Another implementation further has the wire injector having a centered support running the length of the injector to support the tube within the nozzle and to prevent the ceramic-based pasted from flowing up to the wire extruder.

BRIEF DESCRIPTION OF THE DRAWINGS

These and other features, aspects, and advantages of the disclosure will become better understood given the following description, appended claims, and accompanying drawings where:

DESCRIPTION

In the Summary above and the Description, and the claims below, and in the accompany drawings, reference is made to particular features (including method steps) of the implementations with the disclosure. It is to be understood that the disclosure of the implementations in this description include all possible combinations of such particular features. For example, where a particular aspect or embodiment of the implementation, or a particular claim, that feature can also be used, to the extent possible, in combination with and/or in the context of the other particular aspects and implementations of the disclosure, and in the disclosure generally.

Figure 1:
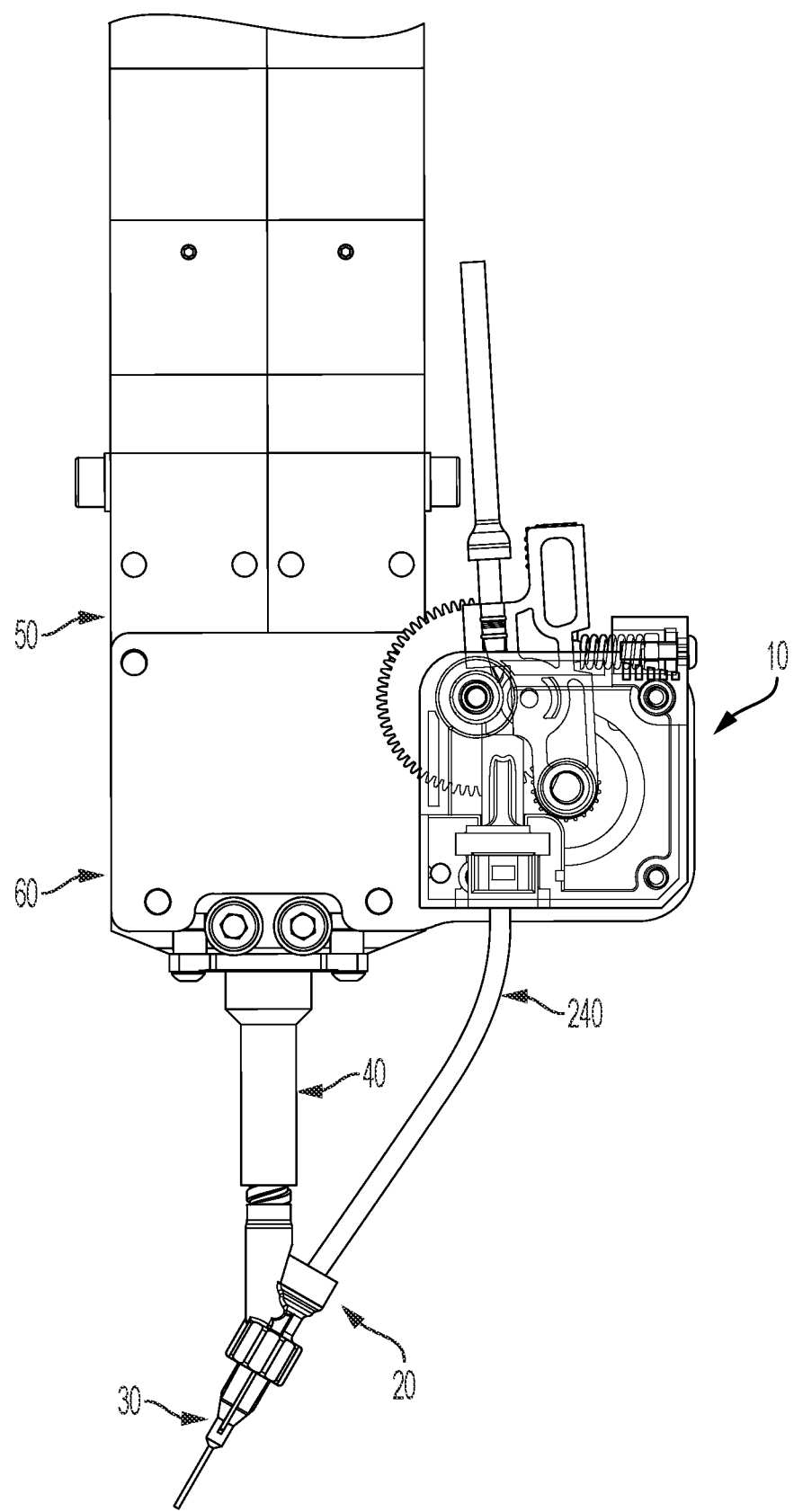
FIG. 1 shows an implementation of the invention installed on a paste/resin extruder.

FIG. 1 depicts the wire extruder 10 as assembled on a paste/resin extruder. The paste/resin extruder is depicted as a dual chamber resin extruder 50, but the implementation is not affected by the specific type of resin/paste extruder used. The wire feeding system consists of two main constituents including an adapter for mixing the wire and the resin/paste ('wire injector') 20, and a motor-driven gear system that feeds the wire into the injector ('wire extruder') 10. The wire extruder 10 is attached at a level above the nozzle 30 with a bracket 60. The wire injector 20 is attached between the outlet 40 of the paste/resin extruder 50 and the depositing nozzle 30. During operation, the wire being fed can be simultaneously with a paste/resin, or by itself. This allows for the creation of bare wire lead-ins/lead-outs to be used for attaching to an electrical or thermal source.

Figure 2A:
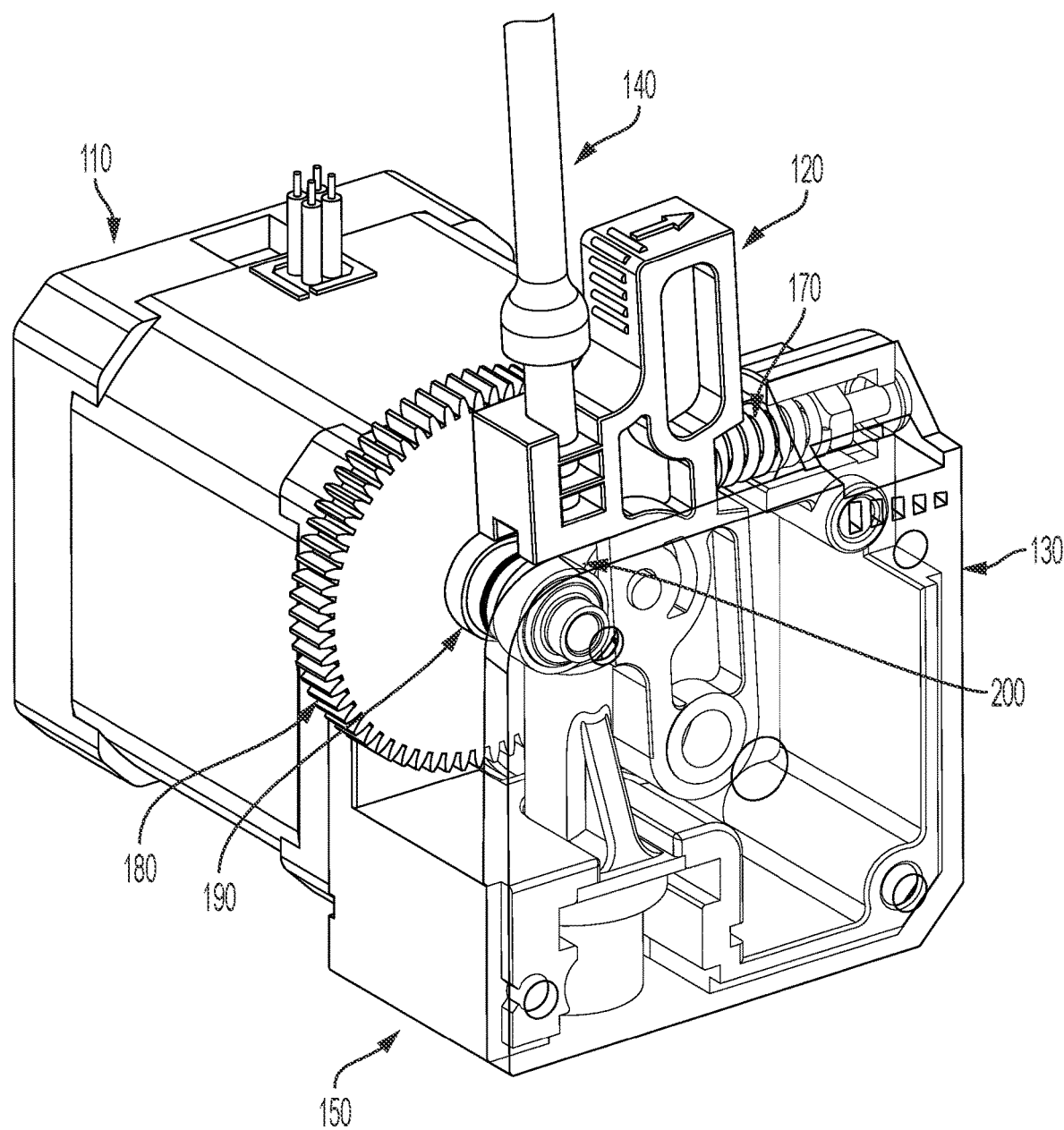
FIG. 2A shows an isometric view of the wire extruder.
Figure 2B:
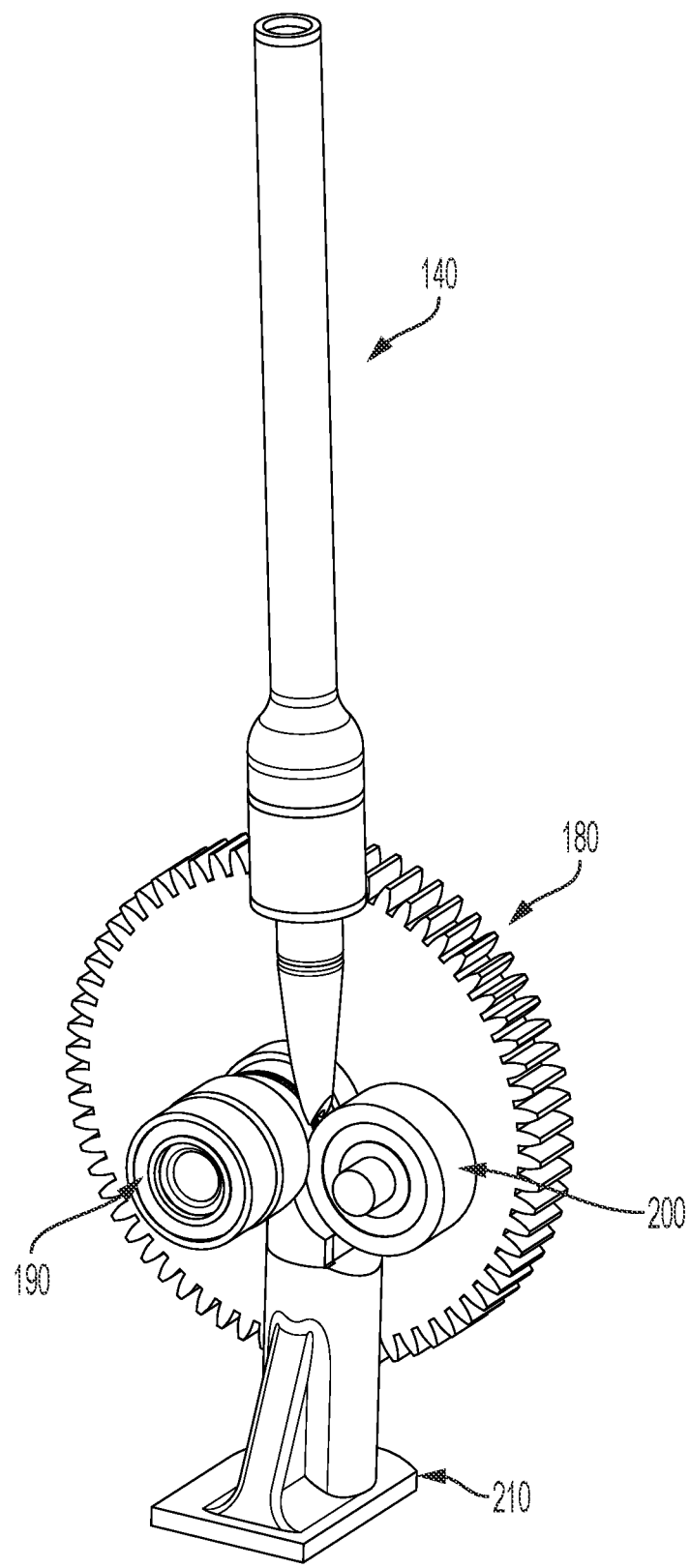
FIG. 2B shows a close-up view of the wire extruder's drive wheel and idler bearing, and pre-extruder guide and guide tube.

FIG. 2A shows an isometric view of the wire extruder 10 attached to stepper motor 110. The stepper motor 110 includes body 150, tensioner arm 120, tensioner spring 170, front cover 130, and idler bearing 200. During operation, the wire is pulled through the pre-extruder guide 140 which centers the wire concentrically with the guide tube 210. The wire extruder 10 grips the wire between the drive wheel 190 and the idler bearing 200. Tension is held against the idler bearing 200 by the tensioner spring 170 pressing against the tensioner arm 120—this helps the drive wheel 190 grip the wire as it rotates FIG. 2B depicts an isolated view of the five of the key components of the wire extruder 10: the pre-extruder guide 140, drive gear 180, drive wheel 190, idler bearing 200, and guide tube 210. These are the key components in the wire extruder 10 that were designed with the sole purpose of extruding thin wires with or without the co-extrusion of a printing material.

Figure 3A:
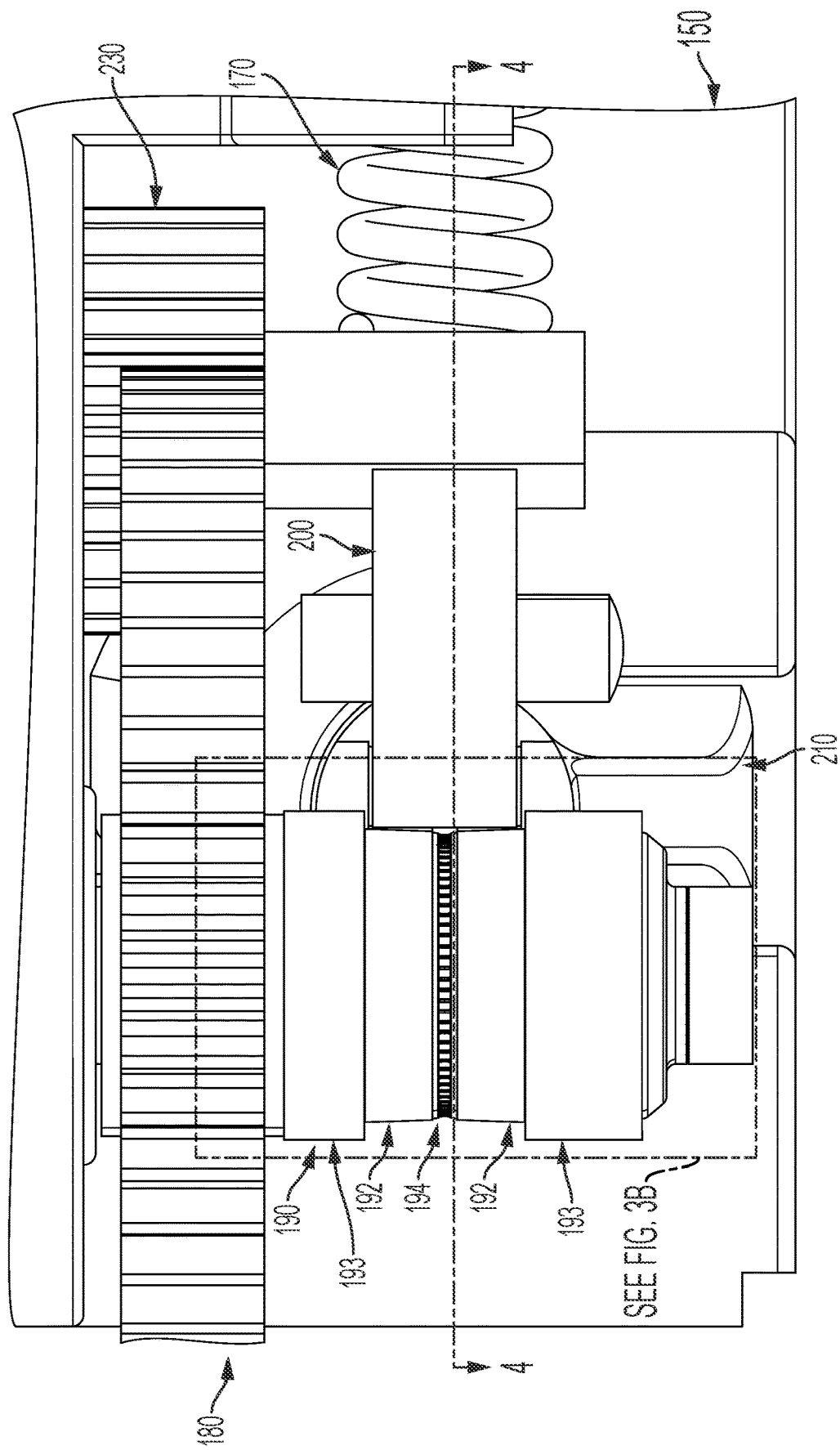
FIG. 3A shows a top view of the wire extruder with the guide tube and tensioner removed.

FIG. 3A shows a top-down view of the wire extruder 10 with the tensioner 120 and pre-extruder guide 140 removed. This view shows the motor-connected gear 230 that is attached to the drive gear 180 that is connected to the drive wheel 190; in operation, the motor 110 is commanded to rotate a set distance, which rotates the drive wheel 190 forcing the wire down and out of the extruder 10. During operation, the wire is centered on the drive wheel 190 by the pre-extruder guide 140.

Figure 3B:
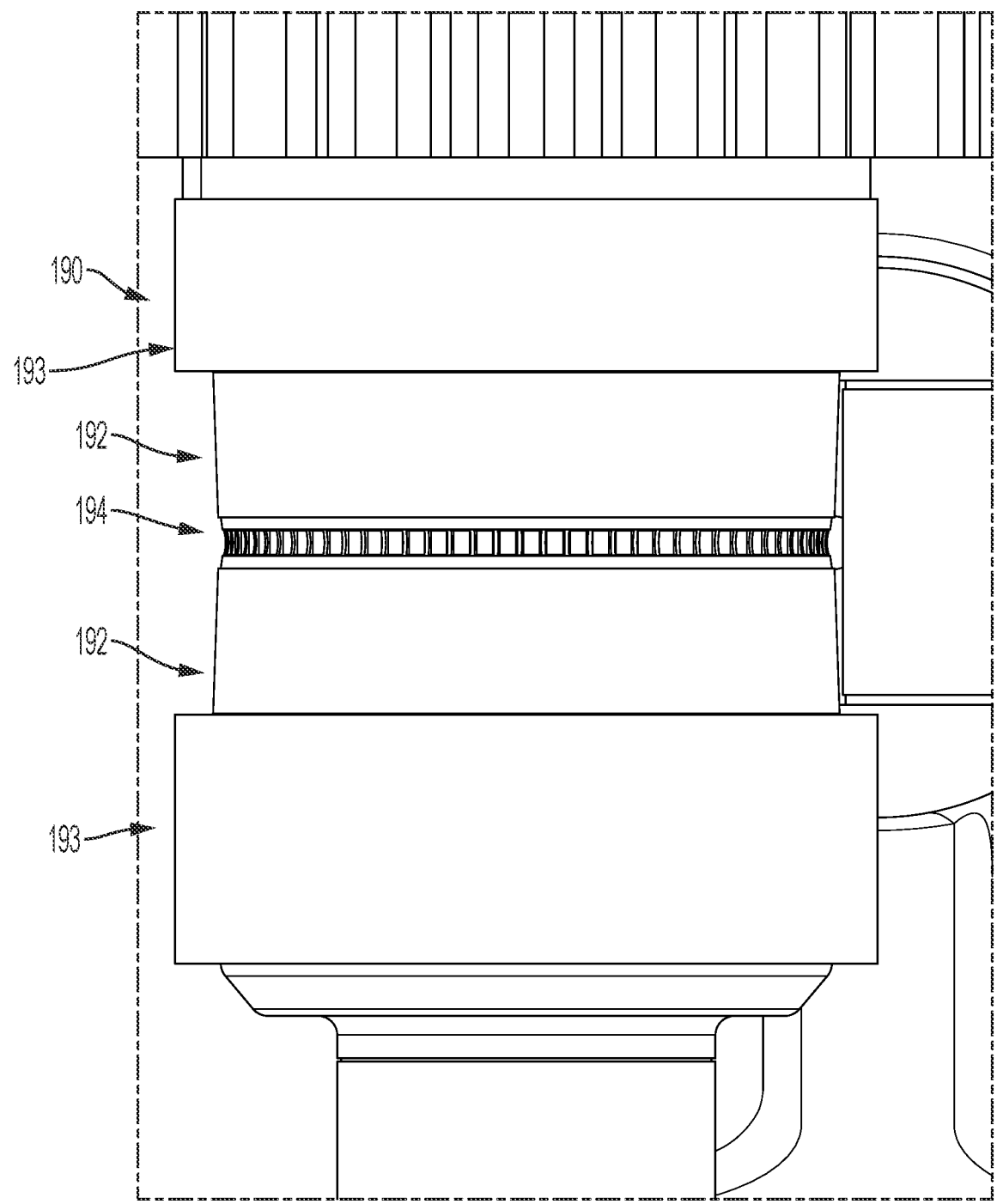
FIG. 3B shows a close-up view of the drive wheel, highlighting the design features that make the extrusion of thin wires possible.

FIG. 3B shows a detailed view of the drive wheel 190. To ensure the wire is kept centered, the drive wheel features two chamfers 192 that help walk the wire to the center groove 194 as the drive wheel 190 is rotated. Additionally, the tension held against the idler bearing 200 acts in conjunction with these chamfers 192 to force the wire to the center groove 194. To ensure proper tension is held against the wire, the high side of the chamfers 192 shall be no more than ¾ of the desired wire's diameter higher than the center groove 194. Further, the center groove 194 shall be no further from the idler bearing 200 than the desired wire's diameter. To prevent the wire from falling between the idler bearing 200 and drive wheel 190, the drive wheel 190 has symmetric walls 193 that overlap the idler bearing 200 with a radial gap no larger than the wire's diameter.

Supposing a wire diameter of 0.004", the chamfer's 192 high edge would need to be no more than 0.003" higher than the center groove so that the idler bearing 200 will still contact and hold tension against the wire. Additionally, the drive wheel's 190 symmetric walls 193 would need to be no further than 0.004" away from the idler bearing 200 on either side; this ensures that if the wire is off center and gets pushed to the high end of the chamfer 192, it cannot slip between the drive wheel's walls 193 and the idler bearing 200. The primarily focus of this apparatus is to extrude wires with a diameter of 0.01"-0.0031" (30-40 AWG) with or without the co-extrusion of a printing material. Specifically, the original intent of this design is to fabricate parts with embedded wires with bare wire leads for attachment to a power source for uniform Joule heating of the fabricated part. In this implementation, the desired wire diameter may change based on a variety of factors. For example, suppose you are using a 38-gauge, nickel-chromium 80 wire with a resistance of about 40Ω per foot, and suppose you are printing layers that contain 10 feet of embedded wire. In this instance, your per-layer resistance would be 400Ω, meaning if you needed to apply 1 amp of current to achieve the desired heating rate, your power supply would need to be deliver 400 volts (based on the V=IR relation). Therefore, it may be necessary to modify the wire diameter (and, consequently, the drive wheel 190 features) to balance your available power source with the desired heating rate and layer geometry.

Figure 4A:
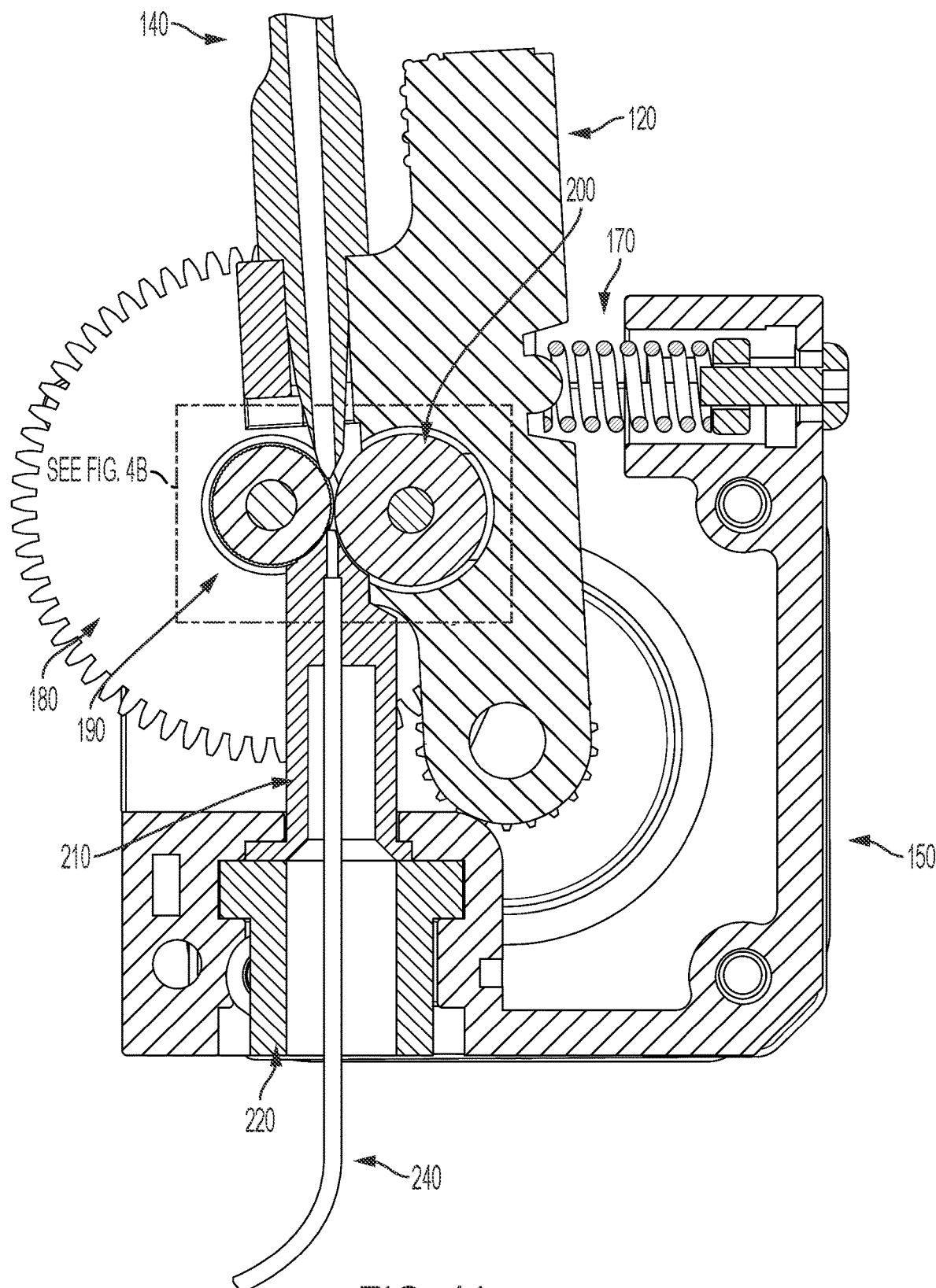
FIG. 4A shows a frontal section view of the wire extruder.

FIG. 4A shows a frontal cut away view of the wire extruder 10. Once the wire is centered on the drive wheel 190 and pushed down, the wire is directed into a guide tube 210 which contains a low-friction tube 240 that constrains the wire to the wire injector 20. The guide tube 210 is held in place by a removable adapter 220 that allows the guide tube 210 to be inserted from the bottom of the wire extruder 10 to clear the two constraining drive wheel walls 196.

Figure 4B:
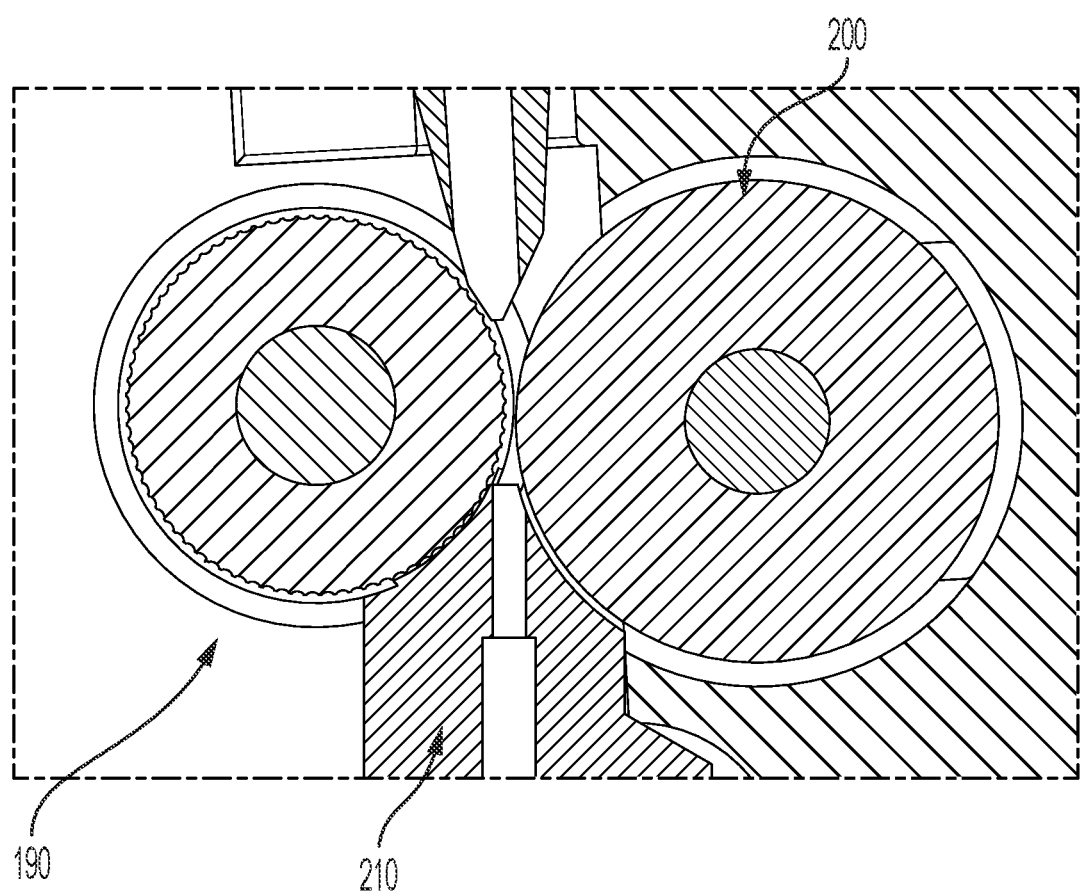
FIG. 4B shows a close up of the drive wheel, idler bearing, and guide tube.

FIG. 4B shows a close up of the drive wheel 190, idler bearing 200, and guide tube 210. The wire will be pushed rigidly by the rotation of the drive wheel 190 and tension held against the idler bearing 200, forcing the wire down through the opening on the guide tube 210. Note that the guide tube's 210 opening is centered under the convergence point between the drive wheel 190 and idler bearing 200 to reduce backpressure on the wire. Additionally, another key design aspect is the close contact between the guide tube 210 and both the drive wheel and idler bearing 200. The drive wheel is in direct contact with the guide tube 210, while the idler bearing is slightly offset from the guide tube 210 (gap no larger than the wire's diameter) to allow the rotation of the tensioner arm 120 (allowing for more than one wire diameter to be accommodate with the apparatus).

As shown in FIGS. 4A and 1, a low friction tube 240 is used to carry the wire from the wire extruder 10 to the wire injector 20 when the two sections are not directly mounted next to each other.

Figure 5:
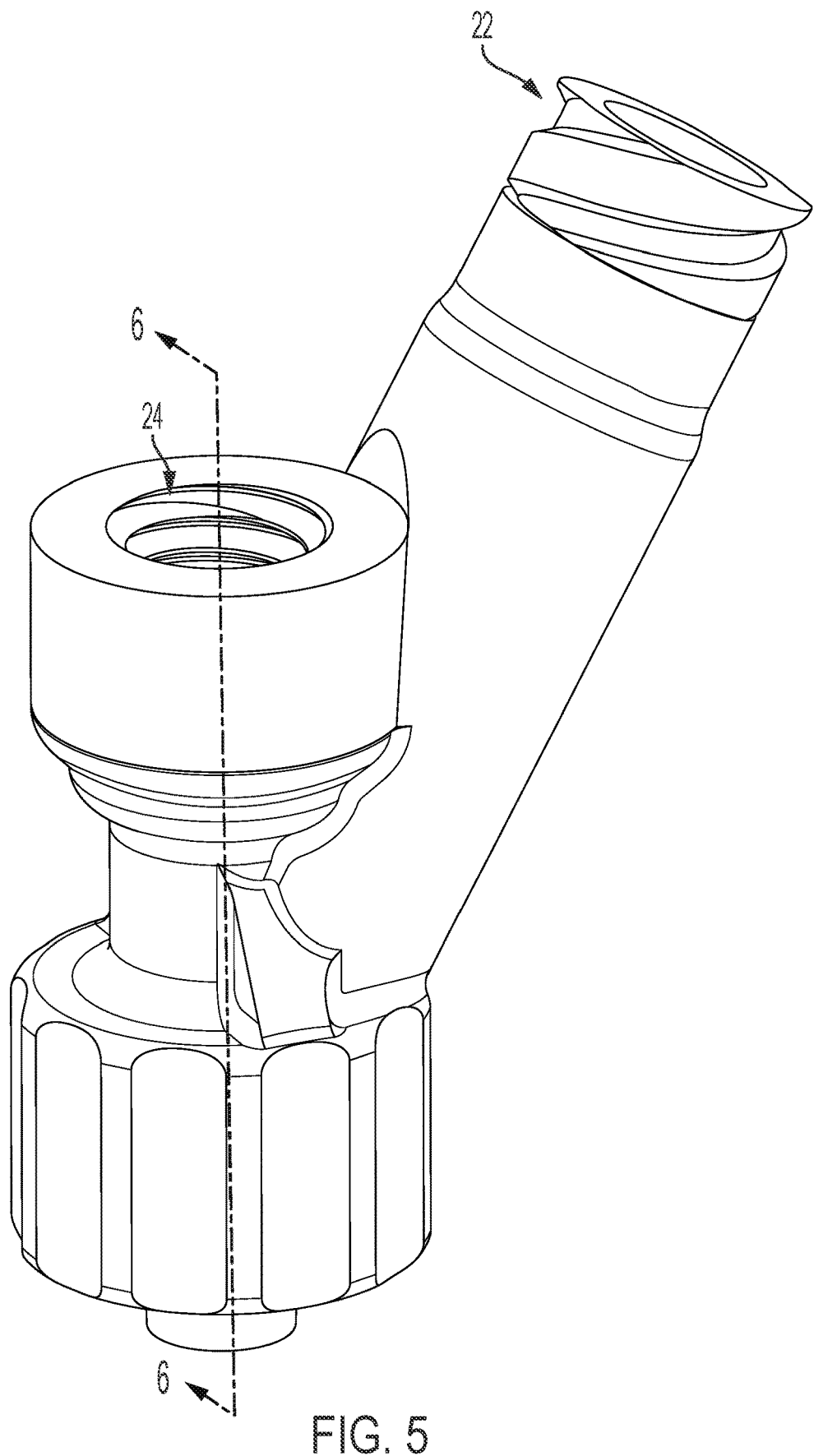
FIG. 5 shows an isometric view of the wire injector.

FIG. 5 shows an isometric wire of the wire injector 20. This piece is used to combine the wire and printing medium (e.g., paste or resin) if the two are to be extruded simultaneously, or to constrain the wire to the nozzle 30 if the wire is the extruded by itself or with the printing medium. The injector 20 features a thread 22 to connect it to the resin/paste extruder's 50 mixing tube 40, or directly to the resin/paste extruder 50 if no mixing tube 40 is used. Additionally, an optional thread 24 on the wire's inlet optionally allows for a push-to-connect fitting to be attached to further constrain the tube 240.

Figure 6:
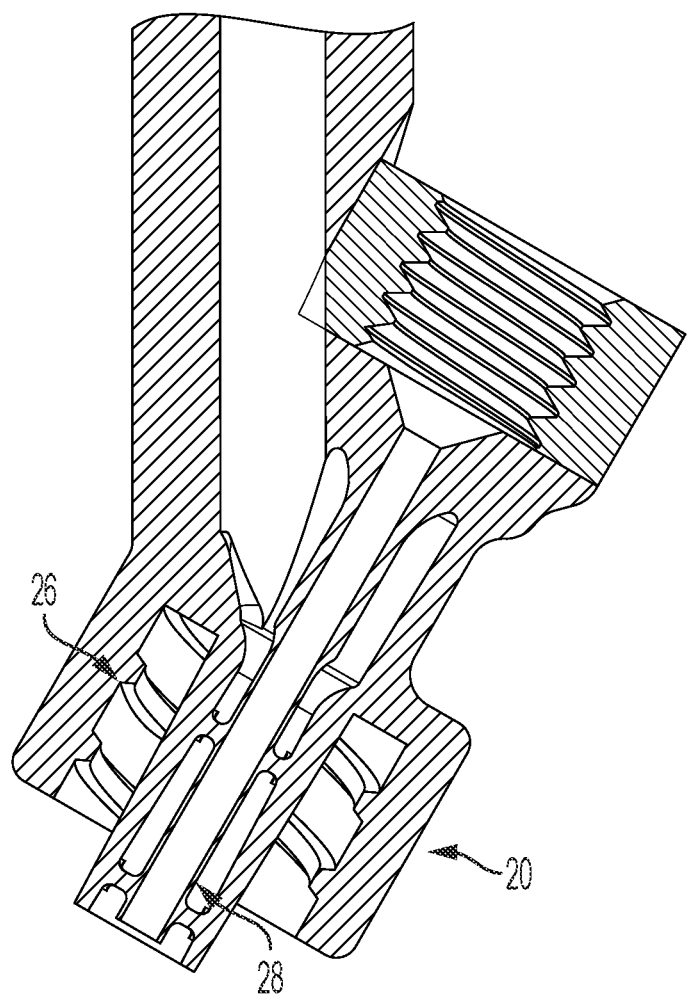
FIG. 6 shows a frontal section view of the wire injector.

FIG. 6 shows a frontal cut away view of the wire injector 20 and nozzle 30. A thread 26 at the bottom of the injector 20 allows for a standard nozzle/dispensing tip 30 to be attached. A centered support 28 runs the length of the injector 20 to support the wire's tube 240 all the way to the nozzle 30, and to prevent paste/resin from flowing up the tube 240 to the wire extruder 10.

This wire extruder is designed and tested for use with gauges of 30-40 AWG (ø 0.01"-ø 0.0031"). Wire buckling is minimized when the wire's tube 240 is constrained and contains no sharp turns (90° or greater) from the wire extruder 10 to the wire injector 20.

The use of this apparatus is accomplished by feeding a 30-40 AWG wire into the top of the pre-extruder guide 140. The tensioner arm 120 is then pulled back to allow the wire to pass through the guide tube 210 and into the carrying tube 240. The wire is then pushed through the carrying tube 240 until it emerges from the end. The tensioner arm 120 is then released and the tensioner spring's 170 tension is adjusted until the wire protruding from the carrying tube 240 cannot be pulled by hand. Then, the tube inserted into the wire injector 20 and the nozzle 30 is mounted. Depending on the paste extruder 50 used, it may be necessary to mount the wire injector 20 before feeding the carrying tube 240 into the wire injector 20.

The previously described implementations within of the present disclosure have many advantages, including, vitally, the ability to extrude thin wires (30-40 AWG) with or without co-extruding a paste or resin. This ability can be leveraged to extrude bare wire sections, or for use with a paste or resin that does not cure, dry, or otherwise solidify shortly after deposition (e.g., a ceramic paste).

While we have shown and described several implementations in accordance with the disclosure, it should be understood that the same is susceptible to further changes and modifications without departing from the scope of the disclosure. Therefore, we do not want to be limited to the details shown and described herein but intend to cover all such changes and modifications as are encompassed by the scope of the appended claims.

What is claimed is:

1. An apparatus for the fabrication of an adsorbent bed formed from a wire embedded ceramic-based paste with bare wire leads extending beyond the adsorbent bed, comprising:
   a motor having a housing with a front cover and the motor having a shaft extending therefrom and the shaft having a motor-connected gear and a tensioner arm attached thereto, the tensioner arm containing an idler bearing, and a tensioner spring in compression between the housing and the tensioner arm;
   a wire extruder having a pre-extruder guide to center a wire as the wire enters the wire extruder, a drive gear, a drive wheel, and a guide tube, wherein the drive gear is geared to the motor-connected gear, the drive wheel is connected to the drive gear and, wherein after the wire passes through the pre-extruder guide, the drive wheel centers and grips the wire under tension provided by the idler bearing pressing against the drive wheel and wire, due to the tensioner spring pressing against the tensioner arm and idler bearing toward the drive wheel, is feed into the guide tube; and
   a wire injector having separate chambers for the wire and a ceramic-based paste and a nozzle for dispensing at least one of the wire alone, a combination of the wire and the ceramic-based paste, and the ceramic-based paste alone.

2. The apparatus of claim 1, wherein the drive wheel further comprises:
   a groove, two chamfers, and two sidewalls, wherein the groove is between the two chamfers and the two chamfers are between the two sidewalls.

3. The apparatus of claim 2, further comprising:
   a tube to carry the wire from the wire extruder to the wire injector.

4. The apparatus of claim 3, wherein the wire injector further comprises:
   a centered support running the length of the wire injector to support the tube within the nozzle and to prevent the ceramic-based pasted from flowing up to the wire extruder.

* * * * *